UNITED STATES PATENT OFFICE 2,352,152

OXAZOLIDINE COMPOUNDS

Saul Kaplan, Rutherford, N. J., assignor to The Richards Chemical Works, Jersey City, N. J., a corporation of New Jersey No Drawing. Application April 20, 1942,
Serial No. 439,719

7 Claims. (Cl. 260—307)

This invention relates to new derivatives of oxazolidine. These new compounds are useful for various purposes. They are surface-active and have capillary activity, and are useful as wetting, emulsifying, foaming, dispersing and penetrating agents, as detergents, as frothing and flotation agents, for bactericidal, fungicidal and insecticidal purposes, as auxiliaries for processing textile materials, for providing water-repellent finishes to textile materials, etc.

The new oxazolidine derivatives may be represented by the general formula

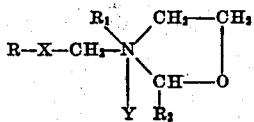

in which R represents an aliphatic, cyclo-aliphatic or naphthenyl radical containing more than 10 carbon atoms, X represents oxygen or the carbonylamide radical —CONH—, $R_1$ represents a lower alkyl radical such as methyl, ethyl, propyl or butyl, $R_2$ represents hydrogen or a lower alkyl radical such as methyl, ethyl, propyl or butyl, and Y represents a salt-forming anion such as the acetate, formate, chloride, bromide, methosulfate, phthalate, phosphate, phosphite, maleate, oxazolidine-sulfite, etc. The term "alkyl radical" as used herein refers to a radical of the type $C_nH_{2n+1}$.

These new products may be prepared in various ways. The chlorides, for example, are advantageously produced by reacting the oxazolidine of the formula

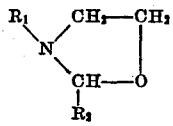

with the desired chloromethyl ether of the formula $ROCH_2Cl$ or the chloromethyl amide of the formula $ROCONHCH_2Cl$. This method of production results in the chlorides which may be converted to salts of other acids than hydrochloric acid in known ways. The new products may also be prepared by reacting the alcohol of the formula ROH or the acyl amide of the formula $RCONH_2$ with formaldehyde, or one of its polymers such as paraformaldehyde, and with the oxazolidine, usually in the presence of an acid or acid anhydride, for example, hydrochloric acid, acetic anhydride, sulfur dioxide, phosphorous trichloride, etc., or by the reaction of the oxazolidine with the hydroxymethyl ether or hydroxymethyl amide, usually in the presence of an acid or acid anhydride. The products may be prepared without the use of a solvent, but it is usually advantageous to carry the reaction out in the presence of an inert solvent such as benzene, methylene dichloride, ethylene dichloride, diethyl Cellosolve, etc.

Where the products are produced by reaction of the oxazolidine with a chlormethyl ether or chlormethyl amide, the reaction is usually exothermic and proceeds at room temperature, although it may be well to heat the reaction mixture to insure completion of the reaction. Where the products are produced from the hydroxymethyl ether or hydroxymethyl acylamide, or from the acylamide and paraformaldehyde or the like, it is usually necessary to heat the reaction mixture somewhat.

Methods by which the intermediates used in preparing the new compounds may be prepared, including the various alkyl and dialkyl oxazolidines, the higher alcohols or acylamides, and the hydroxymethyl and chlormethyl ethers and acylamides are well known.

The ether type compounds, that is, the compounds in which X in the foregoing formula represents an ether oxygen, are stable to both acids and alkalis and may be used with advantage in either acid or alkaline solution; whereas the acylamide compounds, that is, those in which X represents the radical —CONH— do not exhibit stability in alkaline solution, but are stable in acid solution.

Where the compounds are intended for use for foaming, bactericidal or insecticidal purposes, or similar uses, the radical R will advantageously have from 10 to 14 carbon atoms, and advantageously is derived from the fatty alcohols or fatty acid amides, commercially available, which in turn are derived from naturally occurring fats or oils. Where the products are intended for treating fabrics to render them water-repellent, this radical will ordinarily be such a radical with as many carbon atoms as feasible, the limiting factor being the ability of the oxazolidine portion of the radical to solubilize the long hydrocarbon radical. In practice, where the water-repellent compounds are applied to the fabric in aqueous solution, products having 18 to 20 carbon atoms in the radical R, e. g., radicals derived from stearic or arachidic acid give excellent results.

However, the invention also includes products in which the radical R represents a hydrocarbon radical of the cyclo-aliphatic or naphthenyl type, such as products derived from the available naphthenyl alcohols having more than 10 carbon atoms in the average molecule or other materials of the cyclo-aliphatic type such as radicals derived from hydrogenated alkylated naphthol or the like.

Included among the 3-alkyl-oxazolidines which may be used in producing the new compounds are 3-methyl-oxazolidine, 3-ethyl-oxazolidine, 3-butyl-oxazolidine, 2,3-dimethyl-oxazolidine, 2-ethyl-3-methyl-oxazolidine, 2-propyl-3-methyl-oxazolidine, 2,3-diethyl-oxazolidine, and 2-propyl-3-ethyl oxazolidine, and others included within the scope of the general formula given above.

The invention will be further illustrated by the following examples, but it is not limited thereto. All parts are by weight.

*Example 1.*—36 parts of an 80% solution of cetoxymethylchloride in methylene dichloride are added to a solution of 13 parts of 3-methyl-oxazolidine in 10 parts of methylene dichloride. The reaction is exothermic, and after the evolution of heat subsides, the mixture is heated for one half hour to evaporate most of the methylene dichloride. A viscous liquid results which is soluble in water to produce foaming solutions on either the acid or alkaline side. The emulsifying properties of the product are so great that it produces copious foam despite the presence of some methylene dichloride. The amount of oxazolidine may be reduced to 9 parts, but a small amount of unreacted cetoxymethylchloride may then be present in the final product. This new product is 3-methyl-3-cetoxymethyl oxazolidinium chloride.

*Example 2.*—32 parts of chloromethylstearamide are added to a solution of 10 parts of 3-methyl-oxazolidine in 10 parts of diethyl carbitol. After the evolution of heat subsides, the pasty mass is heated to 60° C. for 15 minutes to insure completion of the reaction. The resulting product is unstable in alkaline solutions, but yields stable, usable solutions if dissolved in water containing sufficient amounts of formic or acetic or other acid to yield a solution having a pH of 3 to 5. The product, which is 3-methyl-3-stearamidomethyl oxazolidinium chloride, is well suited for the production of a permanent water-repellent finish on textile material.

*Example 3.*—Hydrochloric acid gas is passed into 50 parts of 3-methyl-oxazolidine until ⅕ of it has been converted to the hydrochloride. 30 parts of hydroxymethylstearamide are then added, and dissolved with stirring at 70 to 80° C. The mixture is then heated until a test portion is soluble in water. The resulting product, which is the same as that of Example 2, is unstable in alkaline solutions. After the completion of the reaction, the excess oxazolidine may be distilled off under reduced pressure. The product is a nearly white powder, which is suitable for making fabrics permanently water repellent.

*Example 4.*—10 parts of commercial stearamide, 10 parts of 3-ethyl-oxazolidine, 1.5 parts of paraformaldehyde, and 10 parts of acetic anhydride are mixed together and heated to a temperature of 80° C., until the product is soluble in water. The pasty mass is washed with cold benzine from which unreacted acetic anhydride and 3-ethyl-oxazolidine can be recovered. The product is 3-ethyl-3-stearamidomethyl oxazolidinium acetate.

*Example 5.*—25 parts of commercial octadecyl alcohol (consisting of approximately equal parts of cetyl and octadecyl alcohol) are dissolved in 100 parts of 3-butyl-oxazolidine. 9 parts of paraformaldehyde are added, and the mixture is heated under a reflux condenser to 85–95° C., and maintained at this temperature while sulfur dioxide is bubbled through it. The reaction is stopped when a test portion is soluble in water, with foaming. Excess 3-butyl-oxazolidine is removed by distillation under reduced pressure. The product consists of a mixture of hexadecoxy- and octadecoxy-methyl-3-butyl - oxazolidinium hydroxides neutralized with 3-butyl-oxazolidine acid sulfite. It is well suited for the production of permanent water-repellent finishes on textiles.

*Example 6.*—27 parts of stearamide and 3 parts of paraformaldehyde are heated with 50 parts of ethylene dichloride to 75 to 80° C. for 9 hours. At the end of this time, the mixture is cooled to 15° C., and 9 parts of 3-methyl-oxazolidine are added. While the mixture is held at 15 to 30° C., 4 parts of phosphorous trichloride are slowly added. The reaction mixture is then heated to 60° C. and kept at this temperature for one hour. It is then cooled to 10° C., filtered, and dried. The product consists of the mixed phosphites and chlorides of the oxazolidinium compounds.

*Example 7.*—18.6 parts of lauryl alcohol are mixed with 50 parts of 2,3-dimethyl-oxazolidine, and 9 parts of paraformaldehyde are added. Sulfur dioxide is passed in until the mixture is soluble. The reaction is accelerated by keeping the temperature at from 80 to 90° C. The product is 2,3-dimethyl-3-dodecoxymethyl oxazolidinium sulfite. It gives excellent foam in dilute aqueous solutions, and is useful as a germicide, fungicide, or insecticide.

*Example 8.*—3 parts of 3-methyl-3-cetoxymethyl oxazolidinium chloride are dissolved in 100 parts of water containing ½ part of crystalline sodium acetate. This solution is used to impregnate cotton gabardine in a padder or mangle. The cloth is dried in a current of air at 50° C. and then subjected to a temperature of 140 to 150° C. for from 6 to 4 minutes. It is then washed in a dilute soap solution, e. g., of 0.1 to 0.4% concentration, rinsed, and dried. The cloth is soft and water-repellent, which effect is not removed by subsequent washings or dry cleaning. If desired, the washing may be omitted, but the water repellency will not be as pronounced until the fabric is dry cleaned or washed by the user. In place of the dilute soap solution, a synthetic detergent solution containing about 0.02% fat may be used.

*Example 9.*—3 parts of 3-methyl-3-stearamidomethyl-oxazolidinium chloride, containing diethyl carbitol, as prepared in Example 2, are dissolved in water containing ½ part of 90% formic acid at 40° C. This solution is then diluted to 100 parts and used to impregnate wool gabardine, using a mangle or other conventional equipment. The solution is preferably kept at 40° C. to insure wetting out the wool. The cloth is then dried in a current of air at 40° C. and baked at 120° C. for 30 minutes. The fabric is water-repellent, and is suitable for the manufacture of overcoats, raincoats, etc. If desired, it may be washed in a dilute detergent solution as described in Example 8.

*Example 10.*—The solution described in Example 9, is used to impregnate nylon parachute cloth. After drying in a current of air at 40° C. the cloth is baked at 150° C. for 30 minutes. It is then permanently water-repellent, and the initial effect may be increased by a soaping as described above.

Example 11.—3-methyl-3-stearamidomethyl-oxazolidinium acetate, prepared as described in Example 4, is dissolved in water at 40° C. to make a 4% solution. This solution is used to impregnate a spun rayon sportswear fabric in a conventional padder or mangle. After drying the cloth in a current of air at 50° C., it is subjected to a baking treatment using a current of air at 150° C. for 4 minutes. The fabric is water-repellent and ideally suited for the manufacture of sportswear. If desired a mild soaping as described above may be included in the treatment.

It will be noted that the foregoing examples illustrate some of the new products and their use for imparting water-repellent properties to fabrics. One of the important advantages of these products is that, while they are quite stable at ordinary temperatures, they possess the thermal instability necessary to yield permanently water-repellent finishes on textile fabrics when they are applied to the fabrics and subsequently subjected to heating, as illustrated in certain of the foregoing examples.

I claim:

1. Oxazolidine derivatives of the formula

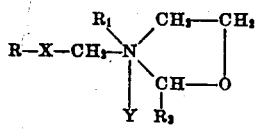

in which R is a hydrocarbon radical containing more than 10 carbon atoms, X is a radical selected from the group consisting of —O— and —CONH— radicals, R₁ is a lower alkyl radical, R₂ is selected from the group consisting of lower alkyl radicals and hydrogen and Y is a salt-forming anion.

2. Oxazolidine derivatives of the formula

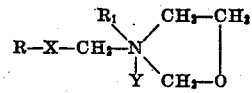

in which R is a hydrocarbon radical containing more than 10 carbon atoms, X is a radical selected from the group consisting of —O— and —CONH— radicals, R₁ is a lower alkyl radical and Y is a salt-forming anion.

3. Oxazolidine derivatives of the formula

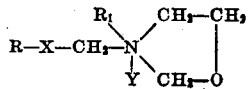

in which R is the carbon linked chain of a naturally occurring fatty acid containing more than 10 carbon atoms, X is a radical selected from the group consisting of —O— and —CONH— radicals, R₁ is a lower alkyl radical and Y is a salt-forming anion.

4. 3-methyl-3-stearamidomethyl oxazolidinium salts.

5. 3-methyl-3-hexadecoxymethyl oxazolidinium salts.

6. Oxazolidine derivatives of the formula

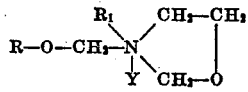

in which R is the carbon linked chain of a naturally occurring fatty acid containing more than 10 carbon atoms, R₁ is a lower alkyl radical and Y is a salt-forming anion.

7. Oxazolidine derivatives of the formula

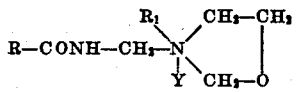

in which R is the carbon linked chain of a naturally occurring fatty acid containing more than 10 carbon atoms, R₁ is a lower alkyl radical and Y is a salt-forming anion.

SAUL KAPLAN.